United States Patent
Bricker et al.

[15] 3,687,247
[45] Aug. 29, 1972

[54] FLOATING LINING HIGH TORQUE BRAKE ASSEMBLY

[72] Inventors: Carl E. Bricker, 2965 McCormick Road, Cuyahoga Falls, Ohio 44224; Kenneth P. Hillegass, 733 W. Market St., Akron, Ohio 44303

[22] Filed: Oct. 16, 1970

[21] Appl. No.: 81,193

[52] U.S. Cl..............188/335, 188/79.5 R, 188/249
[51] Int. Cl..............................F16d 51/06
[58] Field of Search........188/78, 79.5 GC, 79.5 GT, 188/79.5 SC, 79.5 R, 80, 234, 249, 335

[56] References Cited

UNITED STATES PATENTS

| | | | |
|---|---|---|---|
| 1,896,453 | 2/1933 | Loughead | 188/234 X |
| 1,671,759 | 5/1928 | Bendix | 188/234 |
| 3,156,323 | 11/1964 | Boyer | 188/79.5 SC |
| 2,722,293 | 11/1955 | Sykes | 188/244 |

*Primary Examiner*—Evon C. Blunk
*Assistant Examiner*—Johnny D. Cherry
*Attorney*—F. W. Brunner, P. E. Milliken and Oldham & Oldham

[57] ABSTRACT

A drum type brake with an internal expanding shoe. The brake lining is positioned between the shoe and the drum but is not bonded or secured as it floats in place. The lining extends nearly the full circle of the drum. Guides are provided to control the position of the shoe with respect to the lining. It is possible with this design to get excellent self-energizing effects without locking.

4 Claims, 2 Drawing Figures

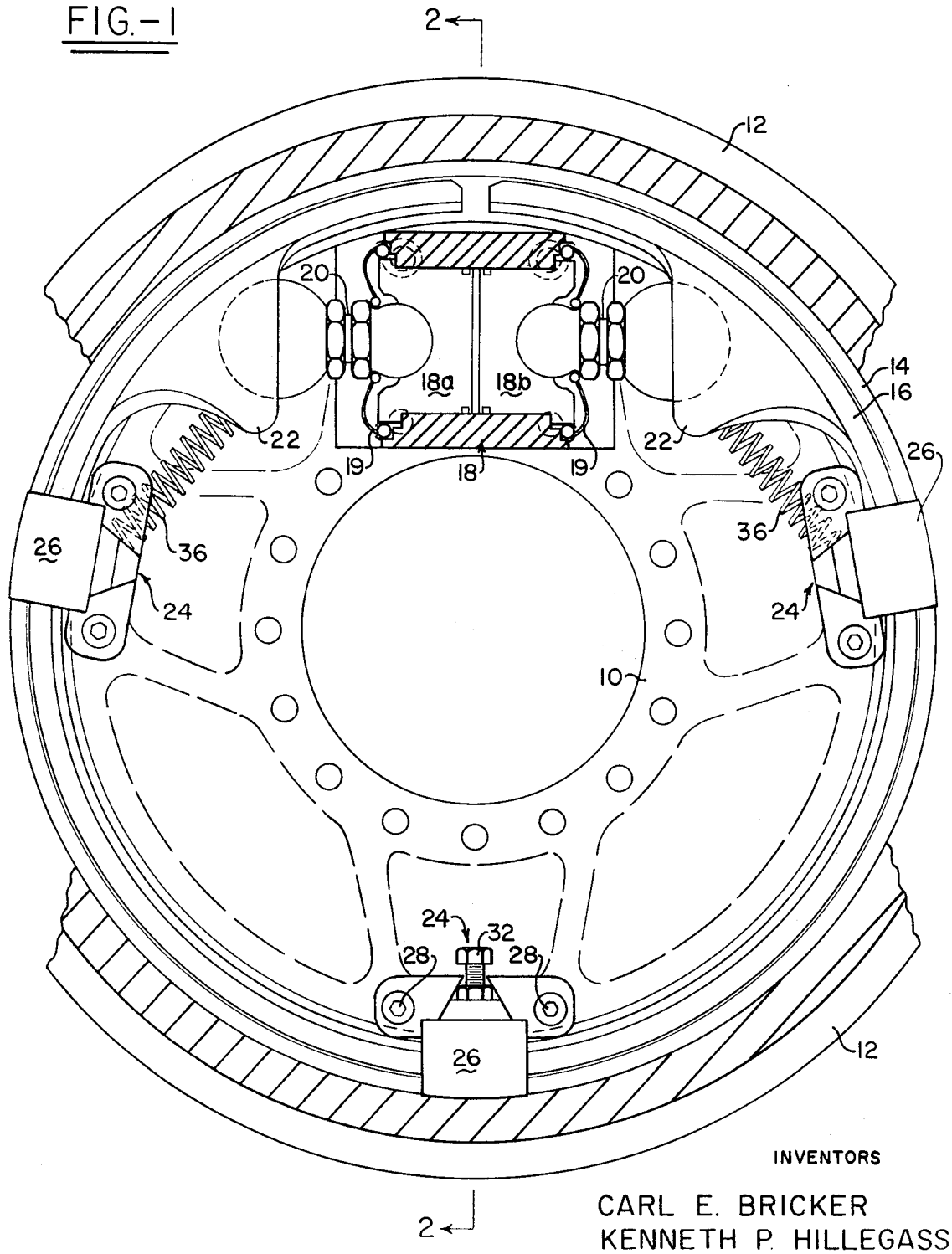

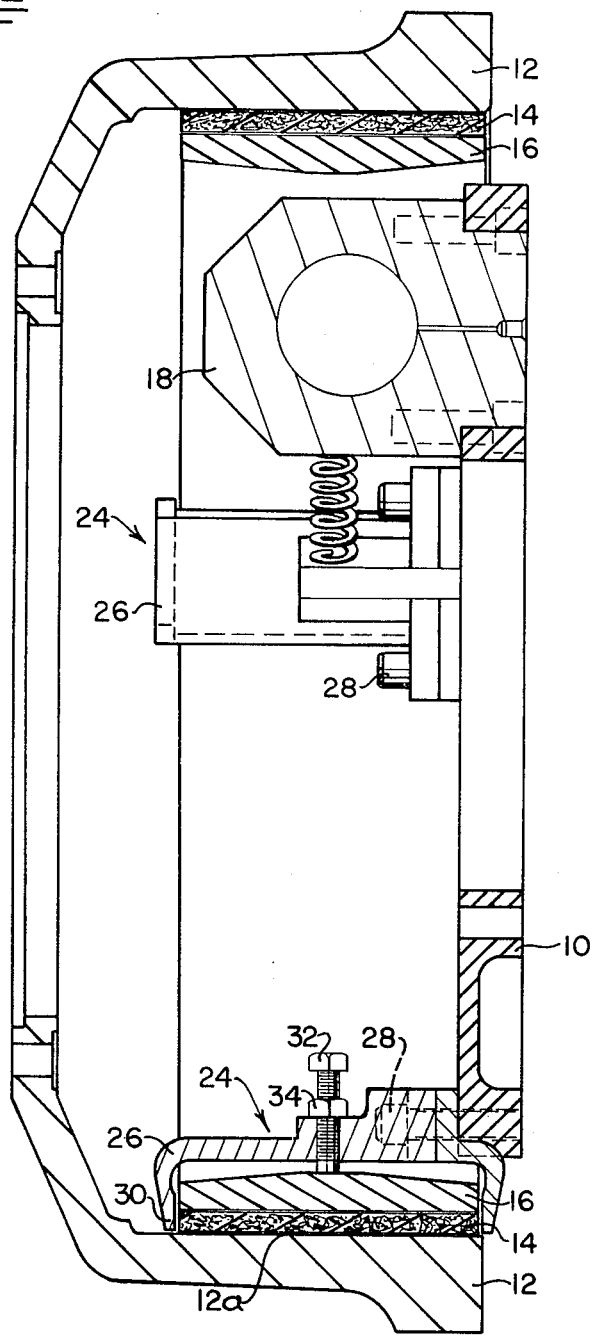

FLOATING LINING HIGH TORQUE BRAKE ASSEMBLY

This invention relates to a drum type brake and more particularly to such a brake having an internal brake shoe and a floating lining between the brake shoe and the drum.

One difficulty that has been encountered with drum type brake assemblies is uneven and localized lining wear. This uneven wear may be due to a number of factors such as uneven pressure being applied across the lining, imperfections in the cylindrical surface of the brake drum, or a self-energizing braking action by the lining. As a result of such localized wear, the brake linings must be replaced even though the major portion of the lining is still usable.

It is the primary object of the present invention to provide a drum type brake in which a self-energizing braking action is achieved, but where localized and uneven wear of the lining is minimized.

A further object of the invention is the provision of a drum type brake in which the lining is free to float and to shift to slightly different positions upon each use of the brake so as to minimize the localized wear of the lining.

A further object of the invention is the provision of a drum brake which is of simple and inexpensive construction, and where because the lining is floating it is easier to change linings at low cost because no riveting or bonding is involved.

The above and other objects and advantages of the invention will become apparent upon consideration of the following specification and the accompanying drawing wherein there is shown a preferred embodiment of the invention.

In the drawings:

FIG. 1 is a plan view of the brake assembly of the present invention; and

FIG. 2 is a vertical sectional view taken along the line 2—2 of FIG. 1.

In the drawings the reference numeral 10 designates a stationary back plate while the numeral 12 designates a brake drum which rotates about its axis. The drum 12 has a cylindrical inner surface 12a. A brake lining 14 is provided adjacent the cylindrical surface 12a. This lining preferably consists of a single piece of friction material formed into a cylindrical shape and of such dimensions that the ends thereof are nearly abutting when the band is new and unworn. Inwardly of the band 14 there is provided a brake shoe 16 which, will be seen from FIG. 1, extends along substantially the entire circumference of the band 14. It should be noted that the lining 14 is separate from and not bonded to the brake shoe 16, this forming an important feature of the present invention.

Mounted on the stationary plate 10 is a brake cylinder assembly 18 which is operable to apply expanding pressure through pistons 18a and 18b to the brake shoe 16 through the shanks 20 and the triangular lugs 22 of the brake shoe 16. The brake will operate effectively regardless of the direction of rotation of the drum as one piston anchors while the other actuates, so they cooperate effectively together. A seal for the piston 18a and 18b is provided by boots 19. This arrangement is of the conventional type and operates to force the adjacent ends of the brake shoe 16 outwardly to force the shoe 16 into contact with the lining 14 and to force both the shoe and the lining outwardly so that the lining 14 contacts the cylindrical inner surface 12a of the brake drum 12.

The relative position of the brake shoe 16 and the lining band 14 is maintained by a series of guides 24 at intervals along the circumference of the stationary plate 10. These guides 24, as shown in FIG. 2, consist of a generally C-shaped member 26 which is bolted to the stationary plate 10 by bolts 28 and which has outwardly projecting leg portions 30 which extend on opposite sides of the brake shoes 16 and the lining material 14. Preferably, the outwardly projecting legs 30 are spaced slightly further apart than the width of the lining band 14 so that a small amount of lateral shifting of the lining is possible. The bottom clamp 24 or the one opposite to the piston means includes a bolt 32 which is threaded through its respective clamp to control the clearance between the shoe 16 and lining material 14. A lock nut 34 is provided on the bolt 32 to hold the adjustment.

While the guides 24 are illustrated, it should be understood that the invention contemplates that any suitable guide means to simply hold the band 14 in lateral relation to the drum 12 and brake shoe 16 would meet the objects of the invention. Hence, one or only a few larger guides of greater arcuate length, or even a full circle guide would be suitable to the same end as the series of guides 24.

Suitable means such as the compression springs 36 acting between the lugs 22 of the shoe 16 and the adjacent clamps 24 are provided to urge the shoe upwardly and inwardly when the cylinder assembly 16 is released so that the lining 14 does not drag on the lower portion of the drum 12.

Since the one piece shoe 16 is nearly a full circle, it is possible to get a much greater self-energizing effect with the brake without the possibility of the brake locking up. To this end, it is important to the invention that the shoe 16 is not rigid, but rather resilient and normally tending to spring away from the braking position. Because the shoe 16 is not rigid, it is impossible with this construction to get a self-locking action of the brake itself.

It is believed that the only practical, economical, and efficient way to utilize the brake of the invention is with the nearly 360° lining 14 and shoe 16. However, it should clearly be recognized that in certain instances the arcuate length might vary between 180° to 360° to still achieve the objects of the invention. In fact two 180° linings and shoes in back to back relation with the actuations separate and 180° apart would be desirable in some instances to eliminate uneven torque on the brake hub caused by the offset position of the actuating cylinder.

It should now be apparent that there has been provided an improved drum type brake assembly in which localized and uneven lining wear is minimized. Since the lining 14 floats between the inner surface 12a of the drum 12 and the shoe 16, the lining may shift in position relative to the shoe 16. As a result, different portions of the lining will be aligned with the shoe at each application of the brake and even wear of the lining will result. Further lining removal and replacement is facilitated. Excellent self energization in either direction is achieved.

While only one embodiment of the invention has been described, it will be apparent that changes and additions may be made to the invention. Reference therefore should be had to the appended claims in determining the true scope of the invention.

What is claimed is:

1. A brake assembly, comprising:
   a rotatable drum having a cylindrical inner surface;
   at least one non-rigid brake shoe within the drum;
   friction lining material between the cylindrical surface of the drum and the brake shoe and separate from the drum and the brake shoe;
   a non-rotating support;
   means affixed to the support for moving the shoe outwardly to force the lining material against the drum and serving to hold the shoe in non-rotating relation relative to the support; and
   at least one guide means carried by the support for maintaining the relative positions of the lining material and the brake shoe.

2. The brake assembly according to claim 1 wherein the lining material is a single strip of friction material formed into a cylindrical configuration with an outer diameter nearly equal to the diameter of the cylindrical inner surface of the drum and with the ends of the strip nearly abutting.

3. The brake assembly according to claim 1 where each guide means includes a C-shaped member having leg portions projecting on opposite sides of the brake shoe and lining material and allowing a limited amount of axial movement between the shoe and lining material.

4. The brake assembly according to claim 1 wherein at least one guide means is adjustable to limit the separation between the brake shoe, lining material, and brake drum.

* * * * *

PO-1050
(5/69)

UNITED STATES PATENT OFFICE
CERTIFICATE OF CORRECTION

Patent No. 3,687,247            Dated August 29, 1972

Inventor(s) Carl E Bricker, Kenneth P Hillegass

It is certified that error appears in the above-identified patent and that said Letters Patent are hereby corrected as shown below:

In the legend, add the following:

--[73] Assignee: The Goodyear Tire & Rubber Company, Akron, Ohio--

Signed and sealed this 6th day of February 1973.

(SEAL)
Attest:

EDWARD M. FLETCHER, JR.
Attesting Officer

ROBERT GOTTSCHALK
Commissioner of Patents